(12) United States Patent
Iwane et al.

(10) Patent No.: US 9,333,491 B2
(45) Date of Patent: May 10, 2016

(54) CATALYST FOR OXYGENATE SYNTHESIS, OXYGENATE PRODUCTION APPARATUS, AND METHOD OF PRODUCING OXYGENATE

(71) Applicants: SEKISUI CHEMICAL CO., LTD., Osaka (JP); COLORADO SCHOOL OF MINES, Golden, CO (US)

(72) Inventors: Kazuyoshi Iwane, Kyoto (JP); Ryan Richards, Golden, CO (US); Christopher Cadigan, Golden, CO (US)

(73) Assignees: SEKISUI CHEMICAL CO., LTD., Osaka (JP); COLORADO SCHOOL OF MINES, Golden, CO (US)

( * ) Notice: Subject to any disclaimer, the term of this patent is extended or adjusted under 35 U.S.C. 154(b) by 433 days.

(21) Appl. No.: 13/785,146

(22) Filed: Mar. 5, 2013

(65) Prior Publication Data

US 2013/0281554 A1   Oct. 24, 2013

Related U.S. Application Data

(60) Provisional application No. 61/607,688, filed on Mar. 7, 2012.

(51) Int. Cl.

| | | |
|---|---|---|
| *B01J 21/02* | (2006.01) | |
| *B01J 23/00* | (2006.01) | |
| *B01J 23/656* | (2006.01) | |
| *C10G 2/00* | (2006.01) | |
| *B01J 35/10* | (2006.01) | |
| *B01J 37/02* | (2006.01) | |
| *B01J 21/10* | (2006.01) | |

(52) U.S. Cl.
CPC .......... *B01J 23/6562* (2013.01); *B01J 35/1019* (2013.01); *B01J 37/0201* (2013.01); *C10G 2/32* (2013.01); *C10G 2/331* (2013.01); *C10G 2/333* (2013.01); *C10G 2/334* (2013.01); *B01J 21/10* (2013.01)

(58) Field of Classification Search
CPC .... B01J 21/10; B01J 35/1019; B01J 37/0201; B01J 23/6562; C10G 2/331; C10G 2/32; C10G 2/333; C10G 2/334

USPC ................. 502/207, 302, 306, 324
See application file for complete search history.

(56) References Cited

U.S. PATENT DOCUMENTS

| | | |
|---|---|---|
| 4,235,798 A | 11/1980 | Bartley et al. |
| 4,463,105 A | 7/1984 | Ichikawa et al. |
| 2002/0037938 A1 | 3/2002 | Luo et al. |
| 2007/0196266 A1 | 8/2007 | Richards et al. |

FOREIGN PATENT DOCUMENTS

| | | |
|---|---|---|
| EP | 0021443 | 1/1981 |
| GB | 2118061 | 10/1983 |
| JP | 56-147730 | 11/1981 |
| JP | 58-180437 | 10/1983 |
| JP | 59-078130 | 5/1984 |
| JP | 61-036730 | 8/1986 |
| JP | 61-036731 | 8/1986 |
| JP | 2001-031602 | 2/2001 |
| WO | 2007/093415 | 8/2007 |

OTHER PUBLICATIONS

Showa Denko, Acetic acid, acetaldehyde and ethanol, JP abstract 57062230, Apr. 1982.*
Tatsumi et al, Supported molybdenum catalysts for alcohol synthesis from syngas, abstract of Applied catalysis (1987), 34 (1-2), 77-88.*
"Efficient Preparation and Catalytic Activity of MgO(111) Nanosheets," Angewandte Chemie International Edition vol. 45, Issue 43, pp. 7727-7281, Nov. 6, 2006.
International Search Report for PCT/JP2013/056255, mailed on Apr. 23, 2013; along with an English translation.

* cited by examiner

*Primary Examiner* — Jafar Parsa
(74) *Attorney, Agent, or Firm* — Greenblum & Bernstein, P.L.C.

(57) ABSTRACT

This invention relates to a catalyst for oxygenate synthesis to use for synthesizing an oxygenate from mixed gas containing hydrogen and carbon monoxide, the catalyst comprising, an (A) component: rhodium, a (B) component: manganese, a (C) component: an alkali metal, and a (Z) component: magnesium oxide.

6 Claims, 3 Drawing Sheets

CATALYST FOR OXYGENATE SYNTHESIS, OXYGENATE PRODUCTION APPARATUS, AND METHOD OF PRODUCING OXYGENATE

The present invention relates to a catalyst for oxygenate synthesis, an oxygenate production apparatus, and a method of producing an oxygenate. Priority is claimed on U.S. Provisional Patent Application No. 61/607,688, filed Mar. 7, 2012, the contents of which are incorporated herein by reference.

TECHNICAL FIELD

Background Art

Bioethanol is becoming increasingly widespread as an alternative fuel to petroleum. The bioethanol is produced mainly through saccharification and fermentation of sugarcane or corn. In recent years, a technique of producing the bioethanol from wood-based biomass and plant-based biomass (which are also referred to as cellulosic biomass) such as wood waste or unused portions of crops such as rice straw, which do not compete with foods and feeds, is under development.

In order to produce bioethanol from cellulosic biomass as a raw material by using ethanol fermentation used in the related art, it is necessary to saccharify cellulose. While saccharification methods using concentrated sulfuric acid, diluted sulfuric acid and oxygen, and hydrothermal saccharification are known, in order to produce bioethanol at a low cost, there are still many problems.

Meanwhile, there is a method of converting cellulosic biomass to a mixed gas containing hydrogen and carbon monoxide and then synthesizing ethanol from this mixed gas. With this method, an attempt to efficiently produce bioethanol from cellulosic biomass, which is difficult to apply to the ethanol fermentation, is being made. In addition, according to this method, not only the wood-based biomass and the plant-based biomass, but also various types of biomass such as animal biomass derived from carcasses or feces of animals, garbage, waste paper, and waste fiber can be used as a raw material.

Moreover, since the mixed gas containing hydrogen and carbon monoxide is obtained from resources other than petroleum, such as natural gas and coal, a method of synthesizing an oxygenate from a mixed gas has been studied as a technique which may break the dependence on petroleum.

As a method of obtaining an oxygenate such as ethanol, acetaldehyde, or acetic acid from a mixed gas containing hydrogen and carbon monoxide, for example, a method of bringing a mixed gas into contact with a catalyst containing rhodium, an alkali metal, and manganese is known (for example, Patent Documents 1 and 2).

CITATION LIST

Patent Document

Patent Document 1: JP-A-61-36730
Patent Document 2: JP-A-61-36731

DISCLOSURE OF INVENTION

Problems to be Solved by the Invention

However, there is a demand for a catalyst for oxygenate synthesis which is able to more efficiently synthesize an oxygenate.

In this respect, the present invention aims to provide a catalyst for oxygenate synthesis that can efficiently synthesize an oxygenate from mixed gas containing hydrogen and carbon monoxide.

A catalyst for oxygenate synthesis according to Claim 1 of the present invention is a catalyst that is used for synthesizing an oxygenate from mixed gas containing hydrogen and carbon monoxide, and contains an (A) component: rhodium, a (B) component: manganese, a (C) component: an alkali metal, and a (Z) component: magnesium oxide.

In the catalyst for oxygenate synthesis according to Claim 2 of the present invention, the magnesium oxide is MgO (111) that has a (111) surface in Claim 1.

The catalyst for oxygenate synthesis according to Claim 3 of the present invention is represented by the following Formula (I) in Claim 1 or 2.

$$aA \cdot bB \cdot cC \quad (I)$$

In Formula (I), A represents the (A) component; B represents the (B) component; C represents the (C) component; a, b, and c represent mol %; a+b+c=1; a=0.053 to 0.98; b=0.00059 to 0.67; and c=0.00056 to 0.51.

In the catalyst for oxygenate synthesis according to Claim 4 of the present invention, the total amount of the (A) to (C) components based on 100 parts by mass of the (Z) component is 0.01 parts by mass to 100 parts by mass in any one of Claims 1 to 3.

The catalyst for oxygenate synthesis according to Claim 5 of the present invention further contains, as a (D) component, any one or more elements selected from the group consisting of zirconium, magnesium, lanthanoid, iron, cesium, boron, aluminum, gallium, indium, thallium, titanium, vanadium, and chromium.

The catalyst for oxygenate synthesis according to Claim 6 of the present invention is represented by the following Formula (II).

$$aA \cdot bB \cdot cC \cdot dD \quad (II)$$

(In Formula (II), A represents the (A) component; B represents the (B) component; C represents the (C) component; D represents the (D) component; a, b, c, and d represent mol %; a+b+c+d=1; a=0.053 to 0.98; b=0.00059 to 0.67; c=0.00056 to 0.51; and d=0.0024 to 0.94.)

An oxygenate production apparatus according to Claim 7 of the present invention includes a reaction tube that is filled with the catalyst for oxygenate synthesis according to any one of Claims 1 to 6, means for supplying the mixed gas into the reaction tube, and means for discharging a product from the reaction tube.

In a method of producing an oxygenate according to Claim 8 of the present invention, the oxygenate is obtained by bringing the catalyst for oxygenate synthesis according to any one of Claims 1 to 6 into contact with the mixed gas containing hydrogen and carbon monoxide.

In the present invention, the term oxygenate refers to a molecule consisting of a carbon atom, a hydrogen atom, and an oxygen atom, such as acetic acid, ethanol, acetaldehyde, methanol, propanol, methyl formate, ethyl formate, methyl acetate, or ethyl acetate.

The catalyst for oxygenate synthesis of the present invention can efficiently synthesize an oxygenate from mixed gas containing hydrogen and carbon monoxide.

BEST MODE FOR CARRYING OUT THE INVENTION

Catalyst for Oxygenate Synthesis

Figure 1:
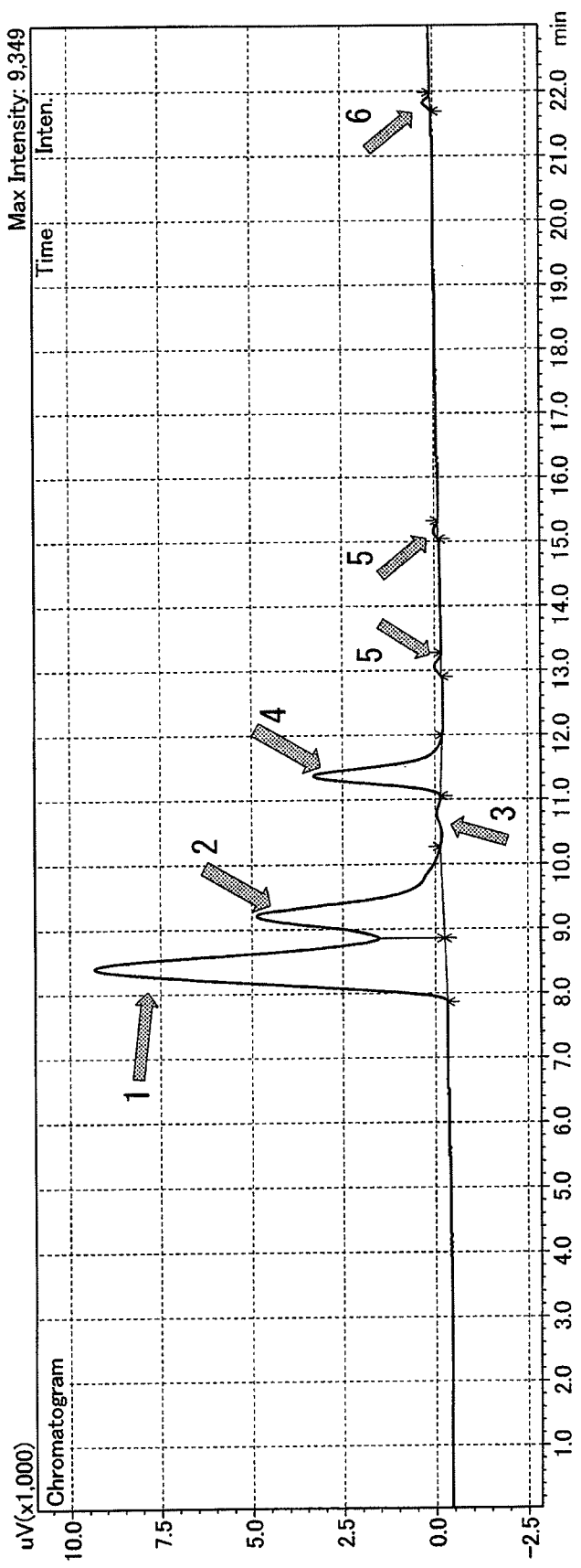
FIG. 1 is a chromatogram of Example 1.

The catalyst for oxygenate synthesis (hereinafter, simply referred to as a catalyst in some cases) of the present invention contains an (A) component: rhodium (Rh), a (B) component: manganese (Mn), a (C) component: an alkali metal, and a (Z) component: magnesium oxide. By containing the (A) to (Z) components, the catalyst can efficiently synthesize an oxygenate.

The (C) component is an alkali metal. Examples of the (C) component include lithium (Li), sodium (Na), potassium (K), rubidium (Rb), cesium (Cs), and the like. Among these, lithium is preferable from the viewpoint that lithium enables a more efficient oxygenate synthesis by decreasing the generation of byproducts and heightening a CO conversion ratio. The term "CO conversion ratio" refers to "a percentage of the number of moles of consumed CO accounting for the number of moles of CO in the mixed gas".

The (Z) component is magnesium oxide (MgO). This magnesium oxide may be natural MgO or unnatural crystalline MgO which is synthesized. Among these MgO, the magnesium oxide in the catalyst of the present invention is preferably magnesium oxide that has a crystallographic (111) surface, from the viewpoint of further heightening the oxygenate synthesis efficiency. Such a suitable magnesium oxide is abbreviated to MgO (111). The (111) surface consists of alternating polar monolayers of oxygen anions and magnesium cations and thus, a strong electrostatic field perpendicular to the (111) surface is created, and the surface is actually the oxygen terminated on both sides but stabilized by hydroxyl groups. As a result, a strong electrostatic field is formed vertically to the (111) surface, and the surface thereof is chemically activated. In the present invention, the MgO (111) having the (111) surface was found to further improve the oxygenate synthesis efficiency by enhancing the catalytic activity of the (A) to (D) components. Therefore, for example, by using the MgO (111) instead of a support such as silica, which has been used for a supported catalyst in the related art, the catalyst according to the present invention can be prepared.

It is said that the (111) surface of MgO does not exist in nature since the surface is electrostatically unstable. Even if the natural MgO crystals are cleaved, a neutral (100) surface or a (110) surface appears, and the (111) surface is not easily obtained. However, by the methods disclosed in the following Citations 1 to 3, it is possible to prepare MgO having the (111) surface. The MgO (111) obtained in these methods typically has a shape of nano-sheets with a diameter of 50 nm to 200 nm and a thickness of 3 nm to 5 nm. Examples of the MgO (111) usable as the (Z) component of the present invention include the MgO (111) that is prepared in the methods disclosed in the following citations. In addition, whether or not the MgO (111) is contained in the catalyst can be determined by a well-known method such as wide-angle X-ray diffraction (WAXD).

Citation 1: International Publication WO 2007/093415
Citation 2: Specification of US Patent Application No. 2007/0196266
Citation 3: "Efficient Preparation and Catalytic Activity of MgO (111) Nano-sheets" (Angewandte Chemie International Edition Volume 45, Issue 43, pages 7277-7281, Nov. 6, 2006)

The (Z) component in the catalyst of the present invention is preferably MgO (111). In the (111) surface of the MgO (111), oxygen anion layers and magnesium cation layers are alternately formed, whereby a strong electrostatic field is formed in a vertical direction to the (111) surface. Consequently, it is considered that due to the interaction between the (111) surface and the CO, the generation of hydrocarbons caused by the catalyst can be further promoted. In other words, C in a CO molecule having a lone pair is strongly attracted to the Mg layer side of the (111) surface that has been positively polarized and forms a coordinate bond, and the CO bond is more polarized, whereby the reactivity is heightened. As a result, it is assumed that since highly reactive CO is near fine particles of the rhodium-based catalyst, the catalytic reaction for generating oxygenates is further promoted.

On the other hand, in the surface of MgO (100), oxygen anions and magnesium cations are evenly dispersed and form a stable bond. Accordingly, compared to the MgO (111), the MgO (100) has lower surface energy and is chemically more stabilized. Therefore, compared to the MgO (111), the MgO (100) is slightly inferior in its efficiency of the oxygenate generation reaction in some cases.

In the catalyst of the present invention, the total amount of the (A) to (C) components based on 100 parts by mass of the (Z) component is preferably 0.01 parts by mass to 100 parts by mass, more preferably 0.01 parts by mass to 10 parts by mass, and even more preferably 0.1 parts by mass to 5 parts by mass. If the total amount is within the above range, the catalytic activity of the (A) to (C) components is enhanced by the (Z) component, whereby the oxygenate synthesis efficiency can be more heightened.

The catalyst of the present invention is preferably composed as shown in the following Formula (I).

$$aA \cdot bB \cdot cC \tag{I}$$

In Formula (I), A represents the (A) component; B represents the (B) component; C represents the (C) component; a, b, and c represent mol %; and $a+b+c=1$.

In Formula (I), a is preferably 0.053 to 0.98. If a is smaller than the lower limit of this range, the amount of the (A) component contained becomes too small, which leads to a problem of the oxygenate synthesis efficiency not being sufficiently heightened. If a exceeds the upper limit of the above range, the amount of the (B) and (C) components contained becomes too small, which leads to a problem of the oxygenate synthesis efficiency not being sufficiently heightened.

In Formula (I), b is preferably 0.00059 to 0.67. If b is smaller than the lower limit of this range, the amount of the (B) component contained becomes too small, which leads to a problem of the oxygenate synthesis efficiency not being sufficiently heightened. If b exceeds the upper limit of the above range, the amount of the (A) and (C) components contained becomes too small, which leads to a problem of the oxygenate synthesis efficiency not being sufficiently heightened.

In Formula (I), c is preferably 0.00056 to 0.51. If c is smaller than the lower limit of this range, the amount of the (C) component contained becomes too small, which leads to a problem of the oxygenate synthesis efficiency not being sufficiently heightened. If c exceeds the upper limit of the above range, the amount of the (A) and (B) components contained becomes too small, which leads to a problem of the oxygenate synthesis efficiency not being sufficiently heightened.

The catalyst of the present invention may further contain, as the (D) component, any one or more elements selected from the group consisting of zirconium (Zr), magnesium (Mg), lanthanoid, iron (Fe), cesium (Cs), boron (B), aluminum (Al), gallium (Ga), indium (In), thallium (Tl), titanium (Ti), vanadium (V), and chromium (Cr).

Herein, lanthanoid is elements from lanthanum to lutetium (Lu) with atomic number through 57 to 71, such as lanthanum (La), cerium (Ce), and praseodymium (Pr).

When the (D) component is cesium, the (C) component is an alkali metal other than cesium.

If the (D) component is contained in the catalyst of the present invention, the oxygenate synthesis efficiency is further heightened in some cases. The mechanism in which the oxygenate synthesis efficiency is heightened when the catalyst contains the (D) component is unclear. However, presumably, the dispersibility of the (A) to (C) components is heightened when the catalyst contains the (D) component.

In the catalyst of the present invention, the total amount of the (A) to (D) components based on 100 parts by mass of the (Z) component is preferably 0.01 parts by mass to 100 parts by mass, more preferably 0.01 parts by mass to 10 parts by mass, and even more preferably 0.1 parts by mass to 5 parts by mass. If the total amount is in this range, the catalytic activity of the (A) to (D) components is further enhanced by the (Z) component, whereby the oxygenate synthesis efficiency can be further heightened.

When the catalyst of the present invention contains the (D) component, the catalyst is preferably composed as shown in the following Formula (II).

$$aA \cdot bB \cdot cC \cdot dD \qquad (II)$$

In Formula (II), A represents the (A) component; B represents the (B) component; C represents the (C) component; D represents the (D) component; a, b, c, and d represent mol %; and $a+b+c+d=1$.

In Formula (II), a is preferably 0.053 to 0.98. If a is smaller than the lower limit of this range, the amount of the (A) component contained becomes too small, which leads to a problem of the oxygenate synthesis efficiency not being sufficiently heightened. If a exceeds the upper limit of the above range, the amount of the (B) to (D) components contained becomes too small, which leads to a problem of the oxygenate synthesis efficiency not being sufficiently heightened.

In Formula (II), b is preferably 0.00059 to 0.67. If b is smaller than the lower limit of this range, the amount of the (B) component contained becomes too small, which leads to a problem of the oxygenate synthesis efficiency not being sufficiently heightened. If b exceeds the upper limit of the above range, the amount of the (A), (C), and (D) components contained becomes too small, which leads to a problem of the oxygenate synthesis efficiency not being sufficiently heightened.

In Formula (II), c is preferably 0.00056 to 0.51. If c is smaller than the lower limit of this range, the amount of the (C) component contained becomes too small, which leads to a problem of the oxygenate synthesis efficiency not being sufficiently heightened. If c exceeds the upper limit of the above range, the amount of the (A), (B) and (D) components contained becomes too small, which leads to a problem of the oxygenate synthesis efficiency not being sufficiently heightened.

In Formula (II), d is preferably 0.0024 to 0.94. If d is smaller than the lower limit of this range, the amount of the (D) component contained becomes too small, which leads to a problem of the oxygenate synthesis efficiency not being sufficiently heightened. If d exceeds the upper limit of the above range, the amount of the (A) to (C) components contained becomes too small, which leads to a problem of the oxygenate synthesis efficiency not being sufficiently heightened.

When the (D) component is titanium, in Formula (II), a is preferably 0.053 to 0.98, more preferably 0.24 to 0.8, and even more preferably 0.32 to 0.67.

When the (D) component is titanium, in Formula (II), b is preferably 0.0006 to 0.67, more preferably 0.033 to 0.57, and even more preferably 0.089 to 0.44.

When the (D) component is titanium, in Formula (II), c is preferably 0.00056 to 0.51, more preferably 0.026 to 0.42, and even more preferably 0.075 to 0.33.

When the (D) component is titanium, in Formula (II), d is preferably 0.0026 to 0.94, more preferably 0.02 to 0.48, and even more preferably 0.039 to 0.25.

When the (D) component is vanadium, in Formula (II), a is preferably 0.06 to 0.98, more preferably 0.23 to 0.8, and even more preferably 0.27 to 0.69.

When the (D) component is vanadium, in Formula (II), b is preferably 0.00068 to 0.67, more preferably 0.034 to 0.57, and even more preferably 0.072 to 0.45.

When the (D) component is vanadium, in Formula (II), c is preferably 0.00064 to 0.51, more preferably 0.027 to 0.42, and even more preferably 0.063 to 0.33.

When the (D) component is vanadium, in Formula (II), d is preferably 0.0024 to 0.93, more preferably 0.017 to 0.45, and even more preferably 0.022 to 0.41.

When the (D) component is chromium, in Formula (II), a is preferably 0.061 to 0.98, more preferably 0.23 to 0.8, and even more preferably 0.28 to 0.69.

When the (D) component is chromium, in Formula (II), b is preferably 0.0007 to 0.67, more preferably 0.035 to 0.57, and even more preferably 0.073 to 0.45.

When the (D) component is chromium, in Formula (II), c is preferably 0.00065 to 0.51, more preferably 0.027 to 0.42, and even more preferably 0.063 to 0.33.

When the (D) component is chromium, in Formula (II), d is preferably 0.0024 to 0.93, more preferably 0.017 to 0.44, and even more preferably 0.022 to 0.4.

When the (D) component is boron, in Formula (II), a is preferably 0.057 to 0.98, more preferably 0.12 to 0.78, and even more preferably 0.22 to 0.55.

When the (D) component is boron, in Formula (II), b is preferably 0.00065 to 0.67, more preferably 0.015 to 0.57, and even more preferably 0.055 to 0.39.

When the (D) component is boron, in Formula (II), c is preferably 0.00061 to 0.51, more preferably 0.013 to 0.41, and even more preferably 0.05 to 0.28.

When the (D) component is boron, in Formula (II), d is preferably 0.0024 to 0.94, more preferably 0.028 to 0.8, and even more preferably 0.13 to 0.57.

When the (D) component is aluminum, in Formula (II), a is preferably 0.053 to 0.98, more preferably 0.19 to 0.78, and even more preferably 0.22 to 0.68.

When the (D) component is aluminum, in Formula (II), b is preferably 0.00059 to 0.67, more preferably 0.026 to 0.57, and even more preferably 0.055 to 0.45.

When the (D) component is aluminum, in Formula (II), c is preferably 0.00056 to 0.51, more preferably 0.022 to 0.41, and even more preferably 0.05 to 0.33.

When the (D) component is aluminum, in Formula (II), d is preferably 0.0024 to 0.95, more preferably 0.028 to 0.6, and even more preferably 0.036 to 0.57.

When the (D) component is iron, in Formula (II), a is preferably 0.064 to 0.98, more preferably 0.23 to 0.81, and even more preferably 0.28 to 0.7.

When the (D) component is iron, in Formula (II), b is preferably 0.00074 to 0.67, more preferably 0.035 to 0.58, and even more preferably 0.0074 to 0.45.

When the (D) component is iron, in Formula (II), c is preferably 0.00069 to 0.51, more preferably 0.028 to 0.42, and even more preferably 0.065 to 0.33.

When the (D) component is iron, in Formula (II), d is preferably 0.0024 to 0.93, more preferably 0.016 to 0.43, and even more preferably 0.021 to 0.39.

When the (C) component is lithium and the (D) component is cesium, in Formula (II), a is preferably 0.1 to 0.98, more preferably 0.26 to 0.83, and even more preferably 0.33 to 0.71.

When the (C) component is lithium and the (D) component is cesium, in Formula (II), b is preferably 0.0014 to 0.67, more preferably 0.043 to 0.58, and even more preferably 0.092 to 0.46.

When the (C) component is lithium and the (D) component is cesium, in Formula (II), c is preferably 0.0012 to 0.51, more preferably 0.033 to 0.43, and even more preferably 0.077 to 0.34.

When the (C) component is lithium and the (D) component is cesium, in Formula (II), d is preferably 0.0024 to 0.83, more preferably 0.0071 to 0.24, and even more preferably 0.009 to 0.21.

When the (D) component is magnesium, in Formula (II), a is preferably 0.18 to 0.78, and more preferably 0.21 to 0.68.

When the (D) component is magnesium, in Formula (II), b is preferably 0.025 to 0.57, and more preferably 0.052 to 0.45.

When the (D) component is magnesium, in Formula (II), c is preferably 0.021 to 0.41, and more preferably 0.047 to 0.33.

When the (D) component is magnesium, in Formula (II), d is preferably 0.028 to 0.63, and more preferably 0.036 to 0.59.

When the (D) component is a lanthanoid, in Formula (II), a is preferably 0.11 to 0.98, more preferably 0.27 to 0.83, and even more preferably 0.33 to 0.71.

When the (D) component is a lanthanoid, in Formula (II), b is preferably 0.0014 to 0.67, more preferably 0.044 to 0.58, and even more preferably 0.092 to 0.46.

When the (D) component is a lanthanoid, in Formula (II), c is preferably 0.0012 to 0.51, more preferably 0.033 to 0.58, and even more preferably 0.078 to 0.34.

When the (D) component is a lanthanoid, in Formula (II), d is preferably 0.0024 to 0.83, more preferably 0.0068 to 0.23, and even more preferably 0.0087 to 0.21.

When the (D) component is zirconium, in Formula (II), a is preferably 0.09 to 0.98, more preferably 0.25 to 0.82, and even more preferably 0.31 to 0.71.

When the (D) component is zirconium, in Formula (II), b is preferably 0.001 to 0.67, more preferably 0.04 to 0.58, and even more preferably 0.085 to 0.46.

When the (D) component is zirconium, in Formula (II), c is preferably 0.0009 to 0.51, more preferably 0.031 to 0.42, and even more preferably 0.073 to 0.34.

When the (D) component is zirconium, in Formula (II), d is preferably 0.0024 to 0.88, more preferably 0.01 to 0.31, and even more preferably 0.012 to 0.28.

In the catalyst of the present invention, the (A) to (C) components may exist independently or form an alloy.

The catalyst of the present invention may be an aggregate of the (A) to (C) components and the (Z) component, or a supported catalyst in which the (A) to (C) components are supported on the (Z) component. The catalyst of the present invention is preferably a supported catalyst. If the catalyst is a supported catalyst, the efficiency of contact between the (A) to (C) components as well as the (Z) component and the mixed gas is heightened, whereby the oxygenate can be more efficiently synthesized. In addition, by causing the (A) to (C) components to be supported on a metal oxide support and mixing the components with the (Z) component, the aggregate described above may be prepared.

In the catalyst of the present invention, the (A) to (D) components may exist independently or form an alloy.

The catalyst of the present invention may be an aggregate of the (A) to (D) components and the (Z) component, or a supported catalyst in which the (A) to (D) components are supported on the (Z) component. The catalyst of the present invention is preferably a supported catalyst. If the catalyst is a supported catalyst, the efficiency of contact between the (A) to (D) components as well as the (Z) component and the mixed gas is heightened, whereby the oxygenate can be more efficiently synthesized. In addition, by causing the (A) to (D) components to be supported on a metal oxide support and mixing the components with the (Z) component, the aggregate described above may be prepared.

As the support, those known as supports of metallic catalysts can be used, and examples of the supports include silica, titania, alumina, ceria, and the like. Among these, silica is preferable from the viewpoints of heightening the selectivity ratio of catalytic reaction and the CO conversion ratio and because various silica products differing in specific surface area and pore size can be obtained on the market.

The term "selectivity ratio" is a percentage of the number of moles of C, which has been converted to a specific oxygenate, accounting for the number of moles of consumed CO in the mixed gas. For example, according to the following (α) Formula, the selectivity ratio of acetic acid as an oxygenate is 100 mol %. On the other hand, according to the following (β) Formula, the selectivity ratio of acetic acid as an oxygenate is 50 mol %, and the selectivity ratio of acetaldehyde as an oxygenate is also 50 mol %.

$$2H_2 + 2CO \rightarrow CH_3COOH \qquad (\alpha)$$

$$5H_2 + 4CO \rightarrow CH_3COOH + CH_3CHO + H_2O \qquad (\beta)$$

As the support, a support having a specific surface area of 10 $m^2/g$ to 1500 $m^2/g$ and a pore size of 1 nm or more is preferable.

In addition, a support having a narrow particle size distribution is preferable. Though not particularly limited, the average particle size of the support is preferably 0.5 μm to 5000 μm.

In the present invention, when the (A) to (C) components or the (A) to (D) components are supported on the metal oxide support, the total amount of the (A) to (C) components or the (A) to (D) components based on 100 parts by mass of the support is preferably 0.01 parts by mass to 10 parts by mass, and more preferably 0.1 parts by mass to 5 parts by mass. If the total amount is less than the lower limit of the range, there is a problem of the oxygenate synthesis efficiency being lowered, and if the total amount exceeds the upper limit of the range, it is difficult for the (A) to (D) components to be evenly and highly dispersed, which leads to a problem of the oxygenate synthesis efficiency being lowered.

The catalyst of the present invention is produced based on well-known methods of producing noble metal catalysts. Examples of the method of producing the catalyst include impregnation, immersion, ion exchange, coprecipitation, kneading, and the like, and among these, impregnation is preferable. If the impregnation is used, the (A) to (C) components or the (A) to (D) components are more evenly dispersed in the obtained catalyst, and the efficiency of the contact between the catalyst and the mixed gas is heightened, whereby the oxygenate can be more efficiently synthesized.

Examples of raw material compounds of the (A) to (D) components used for preparing the catalyst include oxide; chloride; an inorganic salt such as a nitrate or a carbonate; an organic salt or a chelate compound such as an oxalate, an acetylacetonate salt, a dimethylglyoxime salt, or an ethylenediamine acetic acid salt; a carbonyl compound; a cyclopentadienyl compound; an amine complex; an alkoxide compound; an alkyl compound; and the like, which are used as the compounds of the (A) to (D) components for preparing noble metal catalysts in general.

The impregnation will be described. First, the raw material compound of the (A) to (C) components or the (A) to (D) components is dissolved in a solvent such as methanol, ethanol, tetrahydrofuran, dioxane, hexane, benzene, or toluene, and a metal oxide is, for example, immersed in the obtained solution (impregnation solution), thereby attaching the impregnation solution to the (Z) component or the support. When a porous material is used as the support, after the impregnation solution sufficiently permeates the pores, the solvent is evaporated to obtain a catalyst. Examples of the method of impregnating the (Z) component or the support with the impregnation solution include a method (simultaneous method) of impregnating the (Z) component or the support with a solution in which all raw material compounds have been dissolved, a method (sequential method) of preparing solutions in which each of the raw material compounds has been individually dissolved and sequentially impregnating the (Z) component or the support with the respective solutions, and the like.

Examples of the sequential method include a method of impregnating the (Z) component or the support with a solution (primary impregnation solution) containing the (D) component (primary impregnation), drying the resultant to obtain a primary support in which the (D) component has been supported on the (Z) component or the metal oxide support (primary supporting), then impregnating the primary support with a solution (secondary impregnation solution) containing the (A) to (C) components (secondary impregnation), and drying the resultant (secondary supporting), and the like. In this manner, by causing the (D) component to be supported on the (Z) component or the support and then causing the (A) to (C) components to be supported on the metal oxide support, the (A) to (D) components are further highly dispersed in the catalyst, whereby the oxygenate can be more efficiently synthesized.

Examples of the primary supporting include a method of drying the support impregnated with the primary impregnation solution (primary drying) and heating and baking the resultant at an arbitrary temperature (primary baking).

The drying method in the primary drying is not particularly limited, but examples of the method include a method of heating the support impregnated with the primary impregnation solution at an arbitrary temperature. The heating temperature in the primary drying may be a temperature at which the solvent of the primary impregnation solution can be evaporated, and if the solvent is water, the heating temperature is 80° C. to 120° C. The heating temperature in the primary baking is, for example, 300° C. to 600° C. By performing the primary baking, among the components contained in the raw material compound of the (D) component, components that do not assist the catalytic reaction are sufficiently evaporated, whereby the catalytic activity is further enhanced.

Examples of the secondary supporting include a method of drying the primary support impregnated with the secondary impregnation solution (secondary drying) and heating and baking the resultant at an arbitrary temperature (secondary baking).

The drying method in the secondary drying is not particularly limited, but examples of the method include a method of heating the primary support impregnated with the secondary impregnation solution at an arbitrary temperature. The heating temperature in the secondary drying may be a temperature at which the solvent of the secondary impregnation solution can be evaporated, and if the solvent is water, the heating temperature is 80° C. to 120° C. The heating temperature in the secondary baking is, for example, 300° C. to 600° C. By performing the secondary baking, among the components contained in the raw material compound of the (A) to (C) components, components that do not assist the catalytic reaction are sufficiently evaporated, whereby the catalytic activity is further enhanced.

The catalyst prepared by the above-described method is generally activated by being subjected to reduction treatment and used for the oxygenate synthesis. As the reduction treatment, a method of bringing the catalyst into contact with hydrogen-containing gas is preferable due to the simplicity. At this time, the treatment temperature may be a temperature at which rhodium is reduced, that is, about 100° C., but the treatment temperature is preferably 200° C. to 600° C. In addition, for the purpose of sufficiently dispersing the (A) to (D) components, hydrogen reduction may be carried out while the temperature is raised slowly or in stages from low temperature. Moreover, for example, in the presence of carbon monoxide and water, or in the presence of a reductant such as hydrazine, a boron hydride compound, or aluminum hydride compound, the reduction treatment may be performed on the catalyst.

The heating time in the reduction treatment is, for example, preferably 1 hour to 10 hours, and more preferably 2 hours to 5 hours. If the heating time is shorter than the lower limit of the range, the (A) to (D) components are insufficiently reduced, which leads to a problem of the oxygenate synthesis efficiency being lowered. If the heating time exceeds the upper limit of the range, metal particles in the (A) to (D) components aggregate, which leads to a problem of the oxygenate synthesis efficiency being lowered, or that economic disadvantages will be caused since the energy in the reduction treatment become excessive.

Between the primary supporting and the secondary impregnation, surface treatment in which the primary support is brought into contact with an aqueous alkaline solution so as to be surface-treated may be performed. Presumably, by performing the surface treatment, a portion of the primary support surface becomes hydroxide, and the dispersibility of metal particles containing the (A) component is further improved.

The aqueous alkaline solution used in the surface treatment can be determined in consideration of the type or the like of the (D) component and the support, and examples of the aqueous alkaline solution include an aqueous ammonia solution. The concentration of the aqueous alkaline solution can be determined in consideration of the type or the like of the (D) component and the support, and for example, the concentration is set to 0.1 mol/L to 3 mol/L. The method of bringing the primary support into contact with the aqueous alkaline solution is not particularly limited, but for example, a method of immersing the primary support in the aqueous alkaline solution, a method of coating the aqueous alkaline solution to the primary support by means of spraying, and the like can be used.

(Production Apparatus for Oxygenate Synthesis)

The production apparatus for the oxygenate synthesis (hereinafter, simply referred to as a production apparatus in some cases) of the present invention includes a reaction tube that is filled with the catalyst of the present invention, means for supplying mixed gas into the reaction tube, and means for discharging a product from the reaction tube.

Figure 3:
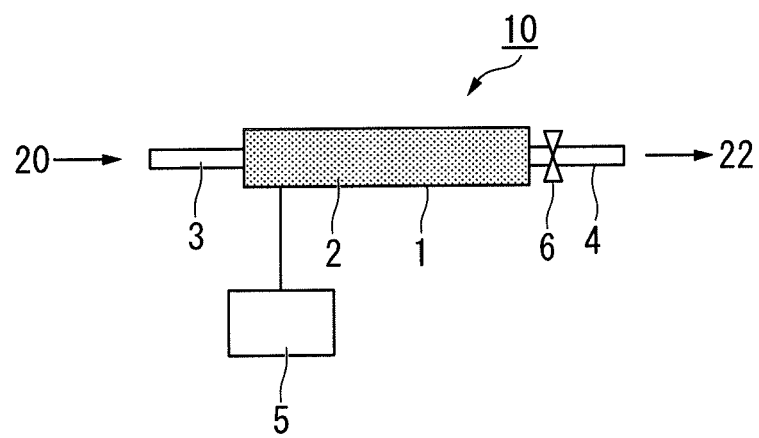
FIG. 3 is a schematic view of an oxygenate production apparatus according to an embodiment of the present invention.

An example of the production apparatus of the present invention will be described by using FIG. 3. FIG. 3 is a schematic view showing a production apparatus 10 according to an embodiment of the present invention. The production apparatus 10 includes a reaction tube 1 in which a reaction bed 2 has been formed due to the catalyst filling the reaction tube, a supply tube 3 that is connected to the reaction tube 1, a discharge tube 4 that is connected to the reaction tube 1, a temperature control portion 5 that is connected to the reaction tube 1, and a pressure control portion 6 that is provided on the discharge tube 4.

The reaction tube 1 is preferably made of a material that is inactive to raw material gas and the synthesized oxygenate, and preferably has a shape that can resist heating at about 100° C. to 500° C. and pressurizing at about 10 MPa. Examples of the reaction tube 1 include an approximately cylindrical member made of stainless steel.

The supply tube 3 is means for supplying the mixed gas into the reaction tube 1, and examples of the supply tube 3 include a pipe made of stainless steel and the like.

The discharge tube 4 is means for discharging the gas (a product) containing the oxygenate synthesized in the reaction bed 2, and examples of the discharge tube 4 include a pipe made of stainless steel and the like.

The temperature control portion 5 may be one that can control the temperature of the reaction bed 2 in the reaction tube 1 to an arbitrary temperature, and examples of the temperature control portion 5 include an electric furnace and the like.

The pressure control portion 6 may be one that can control the internal pressure of the reaction tube 1 to an arbitrary pressure, and examples of the pressure control portion 6 include a well-known pressure valve and the like.

In addition, the production apparatus 10 may include a well-known instrument such as a gas flow rate control portion or the like that adjusts a gas flow rate such as mass flow.

(Method of Producing Oxygenate)

The method of producing an oxygenate of the present invention brings the catalyst into contact with mixed gas. An example of the method of producing an oxygenate of the present invention will be described using the production apparatus in FIG. 3.

First, the inside of the reaction tube 1 is controlled to an arbitrary temperature and an arbitrary pressure, and mixed gas 20 is allowed to flow into the reaction tube 1 from the supply tube 3.

The mixed gas 20 is not particularly limited so long as the gas contains hydrogen and carbon monoxide. For example, the mixed gas 20 may be prepared from natural gas or lime or may be biomass gas that is obtained by gasifying biomass. The biomass gas is obtained by, for example, a well-known method such as a method of heating (for example, at 800° C. to 1000° C.) pulverized biomass in the presence of water vapor.

When the biomass gas is used as the mixed gas 20, for the purpose of removing impurities such as a tar fraction, a sulfur fraction, a nitrogen fraction, a chlorine fraction, and moisture before the mixed gas 20 is supplied into the reaction tube 1, gas purification treatment may be performed. As the gas purification treatment, for example, various methods such as a wet method and a dry method that are known in the related art can be employed. Examples of the wet method include a sodium hydroxide method, an ammonium absorption method, a lime/plaster method, a magnesium hydroxide method, and the like, and examples of the dry method include an activated carbon adsorption method such as pressure swing adsorption (PSA) method, an electron beam method, and the like.

The mixed gas 20 is preferably the gas containing hydrogen and carbon monoxide as main components, that is, the gas in which the total of the hydrogen and carbon monoxide is preferably 50% by volume, more preferably 80% by volume, even more preferably 90% by volume, and may be 100% by volume. The greater the amount of hydrogen and carbon monoxide contained, the greater the amount of the oxygenate produced, and the oxygenate can be more efficiently produced.

The volume ratio represented by hydrogen/carbon monoxide (hereinafter, referred to as $H_2/CO$ ratio in some cases) is preferably 0.1 to 10, more preferably 0.5 to 3, and even more preferably 1.5 to 2.5. If the volume ratio is within this range, hydrogen and carbon monoxide are in stoichiometrically adequate range in the reaction generating an oxygenate from the mixed gas, whereby the oxygenate can be more efficiently produced.

Moreover, the mixed gas 20 may contain methane, ethane, ethylene, nitrogen, carbon dioxide, water, and the like, in addition to hydrogen and carbon monoxide.

The temperature (reaction temperature) at the time of bringing the mixed gas 20 into contact with the catalyst, that is, the internal temperature of the reaction tube 1 is, for example, preferably 150° C. to 450° C., more preferably 200° C. to 400° C., and even more preferably 250° C. to 350° C. If the temperature is equal to or higher than the lower limit of the range, the catalytic reaction rate is sufficiently enhanced, whereby the oxygenate can be more efficiently produced. If the temperature is equal to or lower than the upper limit of the range, the oxygenate can be more efficiently produced from the oxygenate synthesis reaction as a main reaction.

The pressure (reaction pressure) at the time of bringing the mixed gas 20 into contact with the catalyst, that is, the internal pressure of the reaction tube 1 is preferably 0.1 MPa to 10 MPa, more preferably 0.2 MPa to 7.5 MPa, and even more preferably 0.3 MPa to 5 MPa. If the pressure is equal to or higher than the lower limit of the range, the catalytic reaction rate is sufficiently heightened, whereby the oxygenate can be more efficiently produced. If the pressure is equal to or lower than the upper limit of the range, the oxygenate can be more efficiently produced from the oxygenate synthesis reaction as a main reaction.

The mixed gas 20 flowing in flows while contacting the catalyst of the reaction bed 2, and a portion of the mixed gas becomes an oxygenate.

While flowing through the reaction bed 2, the mixed gas 20 generates the oxygenate by, for example, a catalytic reaction represented by the following (1) to (5).

$$3H_2 + 2CO \rightarrow CH_3CHO + H_2O \quad (1)$$

$$4H_2 + 2CO \rightarrow CH_3CH_2OH + H_2O \quad (2)$$

$$H_2 + CH_3CHO \rightarrow CH_3CH_2OH \quad (3)$$

$$2H_2 + 2CO \rightarrow CH_3COOH \quad (4)$$

$$2H_2 + CH_3COOH \rightarrow CH_3CH_2OH + H_2O \quad (5)$$

Gas 22 (product gas) containing the oxygenate is discharged from the discharge tube 4. The gas 22 is not particularly limited so long as the gas contains the oxygenate. However, the gas 22 is preferably gas containing an oxygenate, and more preferably gas containing methanol or ethanol, since the effects of the catalyst of the present invention become marked in the method of producing an oxygenate of alcohol such as methanol or ethanol.

It is preferable that the supply rate of the mixed gas 20 be regulated such that the space velocity (a value obtained by dividing the amount of gas supplied per unit time by the catalyst amount (calculated in terms of volume)) of the mixed gas in the reaction bed 2 becomes 10 L/L-catalyst/h to 100000 L/L-catalyst/h calculated in terms of a standard condition. The space velocity is appropriately adjusted in consideration of the reaction temperature and reaction pressure suitable for the target oxygenate and the composition of the mixed gas as a raw material.

The gas 22 discharged from the discharge tube 4 may be optionally treated by a gas-liquid separator so as to be separated into the unreacted mixed gas 20 and the oxygenate.

In the present embodiment, the mixed gas is brought into contact with the reaction bed 2, which is a fixed bed. However, for example, the catalyst may form a fluid bed or a moving bed other than the fixed bed, and the mixed gas may be brought into contact with the bed.

In the present invention, the obtained oxygenate may be fractionated for each necessary component by distillation or the like.

In addition, in the present invention, converting a product (for example, a C2 compound excluding ethanol, such as acetic acid or acetaldehyde) into ethanol by hydrogenating the product may be performed. Examples of the ethanolation include a method of converting an oxygenate containing acetaldehyde and acetic acid into ethanol by bringing the oxygenate into contact with a hydrogenation catalyst.

Herein, as the hydrogenation catalyst, catalysts known in the related art can be used, and examples thereof include copper, copper-zinc, copper-chromium, copper-zinc-chromium, iron, rhodium-iron, rhodium-molybdenum, palladium, palladium-iron, palladium-molybdenum, iridium-iron, rhodium-iridium-iron, iridium-molybdenum, rhenium-zinc, platinum, nickel, cobalt, ruthenium, rhodium oxide, palladium oxide, platinum oxide, ruthenium oxide, and the like. These hydrogenation catalysts may be supported catalysts supported by the same support as the metal oxide usable for the catalyst of the present invention. As the supported catalyst, a copper-based catalyst in which copper, copper-zinc, copper-chromium, or copper-zinc-chromium is supported on a silica-based support is suitable. Examples of the method of producing the hydrogenation catalyst as a supported catalyst include the above-described simultaneous method or the sequential method.

As described above, by using the catalyst of the present invention, the oxygenate can be efficiently synthesized from the mixed gas. In addition, by using the catalyst of the present invention, the amount of produced methanol or ethanol in the oxygenate is increased.

EXAMPLES

The present invention will be described below by examples, but the present invention is not limited to the examples.

[Preparation of MgO (111)]

The oxide layer of metallic magnesium (manufactured by Sigma-Aldrich Co. LLC.; No. 13103 259) having a purity of 99.5% was sanded and washed, 1.1 g of the Mg was weighed and introduced to a two-neck round bottom flask, and 100 mL of MeOH (purity of 99.8%) was added thereto. While a spinner was spun at 100 rpm in the flask, nitrogen gas was infused into the flask to perform purging for 2 to 3 minutes. After Mg was completely dissolved by stirring for 1 hour, 3.13 g of BZ (4-methoxybenzyl alcohol) was added thereto, and then 7 mL of MeOH was further added thereto and mixed. After nitrogen gas purging was performed for 2 to 3 minutes, the resultant was stirred for 5 hours. Thereafter, 1.62 g of $H_2O$ and 30 mL of MeOH were added thereto, followed by nitrogen gas purging for 2 to 3 minutes, and the resultant was stirred for 12 hours.

The obtained solution was moved to an autoclave (a high temperature and high pressure-resistant container), the air in the autoclave was purged with an inert gas, and then the autoclave was pressurized up to 10 bar with the gas. Subsequently, the autoclave was pressurized and heated (without stirring) at 265° C. for 5 hours.

Thereafter, the solvent such as MeOH was removed by being exhausted, followed by purging with inert gas, and the resultant was left as is until the temperature became room temperature. Subsequently, the solid in the container was moved to a heat-resistant beaker and baked by a sintering oven. The baking was performed in a program in which the temperature was raised from room temperature (20° C.) to 500° C. by 3° C. per minute and kept at 500° C. for 6 hours. In this manner, the MgO (111) was obtained.

Example 1

First, to a flask, 0.4739 g of $RhCl_3.3H_2O$, 0.0356 g of $MnCl_2.4H_2O$, and 0.0327 g of $LiCl.H_2O$ were introduced, and 10 mL of $H_2O$ was added thereto. The resultant was stirred at room temperature for 12 hours by a spinner spinning at 200 rpm, thereby preparing a catalyst solution.

Thereafter, 1.0 g of MgO (111) was introduced to a glass bottle, and about 1.11 g of the catalyst solution was added dropwise thereto. The resultant was evenly mixed and left as is for 30 minutes, and then placed in an oven at 95° C. for 3 hours, thereby evaporating water as a solvent. Subsequently, the resultant was taken out of the oven and cooled, and then about 1.11 g of the catalyst solution was again added dropwise thereto. The resultant was evenly mixed and left as is for 30 minutes, and then placed in an oven at 95° C. for 3 hours, thereby evaporating water as a solvent. The resultant was then taken out of the oven, and the obtained sample was placed in porcelain, followed by baking. The baking was performed in a program in which the temperature was raised from room temperature (20° C.) to 450° C. for 1.5 hours and kept at 450° C. for 3 hours. In this manner, a catalyst for oxygenate synthesis was prepared.

In the catalyst obtained in Example 1, the proportion between the (A) to (C) components was Rh:Mn:Li=10:1:3 (molar ratio)=0.714:0.0714:0.214 (mol %). In addition, the total amount of the (A) to (C) components based on 100 parts by mass of the MgO (111) as the (Z) component was about 4.2 parts by mass.

The central portion of a cylindrical reaction tube made of stainless steel that has a diameter of ½ inch and a length of 50 cm was filled with 0.5 g of the prepared catalyst for oxygenate synthesis and 2.5 g of silica sand, thereby forming a reaction bed. Nitrogen gas was caused to flow through the reaction bed at 200 mL/min to purge the air in the reaction tube. Thereafter, while hydrogen gas and nitrogen gas were caused to flow through the reaction bed at 200 mL/min and 50 mL/min respectively, the temperature was raised from room temperature to 320° C. for 1.5 hours, and then the temperature was kept at 320° C. for 2.5 hours, thereby performing reduction treatment on the catalyst.

Subsequently, under conditions of a reaction temperature of 250° C. and a reaction pressure of 0.35 MPa, mixed gas ($H_2$ 200 mL/min, CO 100 mL/min, and N2 35 mL/min) was caused to flow through the reaction bed at 335 mL/min, thereby producing an oxygenate.

The mixed gas was caused to flow through the reaction bed for 3 hours, and the thus obtained gas was recovered and analyzed by gas chromatography. The chart of the gas chromatography is shown in FIG. 1. In addition, peak areas corresponding to methane (peak 1), acetaldehyde (peak 2), methanol (peak 3), ethanol (peak 4), and acetic acid (peak 6) in the chart and "Relative conversion" are shown together in Table 1. Herein, "Relative conversion" refers to the proportion of the peak area expressed when the peak area corresponding to Comparative Example 1 is assumed to be 100%. Moreover, the substance corresponding to peak 5 was unidentified.

Comparative Example 1

To 1.0 g of silica gel (specific surface are: 310 m²/g, average pore size: 14 nm, pore capacity: 1.1 cm³/g), about 1.11 g of the catalyst solution prepared in Example 1 was added dropwise, thereby performing impregnation. The resultant was dried at 110° C. for 3 hours, and 1.11 g of the catalyst solution was again added dropwise thereto to perform impregnation, followed by baking at 450° C. for 3 hours, thereby preparing a catalyst of Comparative Example 1.

Figure 2:
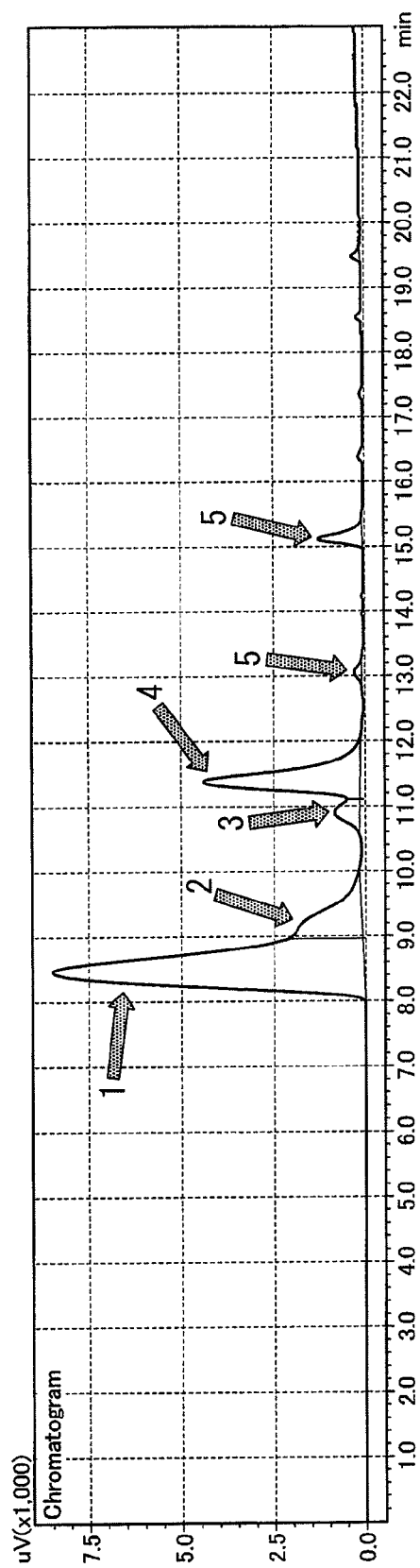
FIG. 2 is a chromatogram of Comparative Example 1.

Subsequently, by using the prepared catalyst, an oxygenate was produced under the same conditions as those of Example 1. The mixed gas was caused to flow through the reaction bed for 3 hours, and the thus obtained gas was recovered and analyzed by gas chromatography. The chart of the gas chromatography is shown in FIG. 2. In addition, peak areas corresponding to methane (peak 1), acetaldehyde (peak 2), methanol (peak 3), ethanol (peak 4), and acetic acid (peak 6) in the chart and "Relative conversion" are shown together in Table 1. All of the "Relative conversion" of Comparative Example 1 were set to 100% so as to be used as a standard. Moreover, the substance corresponding to peak 5 was unidentified.

was increased 1.7 times or more, the amount of methanol generated was increased 9.9 times or more, the amount of ethanol generated was increased 2.1 time or more, and the average amount of all detected oxygenates and methane generated was increased 1.4 times or more.

These results clearly show that by using the catalyst for oxygenate synthesis of the present invention, the amount of the oxygenate generated is increased, and the oxygenate can be more efficiently produced from the mixed gas.

Moreover, the catalyst for oxygenate synthesis of the present invention is excellent not only in oxygenate generation efficiency but also in methane generation efficiency. Accordingly, the catalyst for oxygenate synthesis of the present invention may also be used as a catalyst for methane synthesis.

REFERENCE SIGNS LIST

1: REACTION TUBE
2: REACTION BED
3: SUPPLY TUBE
4: DISCHARGE TUBE
5: TEMPERATURE CONTROL PORTION
6: PRESSURE CONTROL PORTION
10: PRODUCTION APPARATUS
20: MIXED GAS
22: GAS (PRODUCT GAS)

The invention claimed is:

1. A catalyst for oxygenate synthesis to use for synthesizing an oxygenate from mixed gas containing hydrogen and carbon monoxide, the catalyst comprising:
   an (A) component: rhodium;
   a (B) component: manganese,
   a (C) component: an alkali metal; and
   a (Z) component: magnesium oxide.

TABLE 1

|  |  | Methane | Acetaldehyde | Methanol | Ethanol | Acetic acid | Total |
|---|---|---|---|---|---|---|---|
| Example 1 | Peak area | 285363 | 45512 | 13963 | 88407 | 0 | 433245 |
|  | Relative conversion | 171.4% | 53.3% | 991.0% | 211.2% | 0.0% | 142.2% |
| Comparative Example 1 | Peak area | 166501 | 85429 | 1409 | 41868 | 9520 | 304727 |
|  | Relative conversion | 100.0% | 100.0% | 100.0% | 100.0% | 100.0% | 100.0% |

Regarding the catalyst of Comparative Example 1, the MgO (111) prepared, and the catalyst of Example 1, the surface area and pore size were measured. For the measurement, an apparatus Surface area and Porosity Analyzer manufactured by Micromeritics Instrument Corporation was used. The measurement results and acid-base properties of the respective samples are shown together in Table 2.

TABLE 2

| Measured sample | Approximate surface area (m²/g) | Approximate pore size (nm) | Acid/base properties |
|---|---|---|---|
| Comparative Example 1 | 300 | 15 | Neutral |
| MgO (111) | 200 | Non porous | Lewis base |
| Example 1 | 100 | Non porous | Lewis base |

When the catalyst of Example 1 was used, compared to Comparative Example 1, the amount of methane generated 2. The catalyst for oxygenate synthesis according to claim 1,
   wherein the magnesium oxide is MgO (111) that has a (111) surface.

3. The catalyst for oxygenate synthesis according to claim 1,
   wherein the catalyst is represented by of the following Formula (I):

$$aA \cdot bB \cdot cC \qquad (I)$$

wherein A represents the (A) component; B represents the (B) component; C represents the (C) component; a, b, and c represent mol %; a+b+c=1; a=0.053 to 0.98; b=0.00059 to 0.67; and c=0.00056 to 0.51.

4. The catalyst for oxygenate synthesis according to claim 1,
   wherein the total amount of the (A) to (C) components based on 100 parts by mass of the (Z) component is 0.01 parts by mass to 100 parts by mass.

5. The catalyst for oxygenate synthesis according to claim 1, further comprising, as a (D) component, any one or more elements selected from the group consisting of zirconium, magnesium, a lanthanoid, iron, cesium, boron, aluminum, gallium, indium, thallium, titanium, vanadium, and chromium.

6. The catalyst for oxygenate synthesis according to claim 5,
wherein the catalyst is of the following Formula (II):

$$aA \cdot bB \cdot cC \cdot dD \quad \text{(II)}$$

wherein A represents the (A) component; B represents the (B) component; C represents the (C) component; D represents the (D) component; a, b, c, and d represent mol %; a+b+c+d=1; a=0.053 to 0.98; b=0.00059 to 0.67; c=0.00056 to 0.51; and d=0.0024 to 0.94.

* * * * *